United States Patent
Eldredge et al.

(10) Patent No.: US 12,123,388 B1
(45) Date of Patent: Oct. 22, 2024

(54) HYBRID RENEWABLE PUMPED STORAGE HYDROPOWER ENERGY STORAGE SYSTEM

(71) Applicants: Thomas Vance Eldredge, Forest, VA (US); Hector Eduardo Medina, Forest, VA (US)

(72) Inventors: Thomas Vance Eldredge, Forest, VA (US); Hector Eduardo Medina, Forest, VA (US)

(73) Assignee: Hector Eduardo Medina Thomas Vance Eldredge, Forest, VA (US)

( * ) Notice: Subject to any disclaimer, the term of this patent is extended or adjusted under 35 U.S.C. 154(b) by 0 days.

(21) Appl. No.: 18/542,652

(22) Filed: Dec. 16, 2023

Related U.S. Application Data

(63) Continuation-in-part of application No. 17/671,146, filed on Feb. 14, 2022, now Pat. No. 11,846,263.

(60) Provisional application No. 63/148,680, filed on Feb. 12, 2021.

(51) Int. Cl.
| | |
|---|---|
| *F03B 13/06* | (2006.01) |
| *F03B 17/06* | (2006.01) |
| *F03D 5/00* | (2006.01) |
| *F03G 6/00* | (2006.01) |

(52) U.S. Cl.
CPC ............. *F03B 13/06* (2013.01); *F03B 17/06* (2013.01); *F03D 5/00* (2013.01); *F03G 6/001* (2013.01)

(58) Field of Classification Search
CPC .. F03B 13/06; F03B 17/06; F03D 5/00; F03G 6/001
See application file for complete search history.

(56) References Cited

U.S. PATENT DOCUMENTS

2019/0186458 A1 * 6/2019 Obermeyer ........... F04D 29/548

* cited by examiner

*Primary Examiner* — Viet P Nguyen
(74) *Attorney, Agent, or Firm* — Jong Patent Firm; Cheng Ning Jong; Tracy P. Jong

(57) ABSTRACT

A pumped storage hydroelectric system may include a reservoir system including an upper reservoir system and a lower reservoir system. At least one of the upper reservoir system and the lower reservoir system may include a modular reservoir arrangement. A penstock may be coupled with the upper reservoir system. A pump/turbine may be coupled with the penstock and with the lower reservoir system. The pump/turbine may be configured to receive water flowing from the upper reservoir system to the lower reservoir system for generating electrical power, and to pump water from the lower reservoir system to the upper reservoir system for storing energy.

16 Claims, 11 Drawing Sheets

Pressure response to water hammer event for 3 sec valve closure time with no mitigation Pressure response to water hammer event for 1 sec valve closure time with no mitigation and with mitigation PRV and PCV controlled responses for mitigating water hammer event for 1 sec valve closure time

HYBRID RENEWABLE PUMPED STORAGE HYDROPOWER ENERGY STORAGE SYSTEM

PRIORITY CLAIM AND RELATED APPLICATIONS

This continuation-in-part application claims the benefit of priority from non-provisional application U.S. Ser. No. 17/671,146 filed on Feb. 14, 2022 and provisional application U.S. Ser. No. 63/148,680 filed on Feb. 12, 2021. Each of said applications is incorporated by reference in its entirety.

BACKGROUND OF THE INVENTION

1. The Field of the Invention

The present disclosure generally relates to pumped storage hydropower systems.

2. Background Art

Conventionally, much pumped storage hydroelectric installations are constructed at utility scale, with output capacities greater than 200 MW. Such installations require custom, site-specific design and construction, which can be extremely expensive.

Additionally, the scale of the projects can present many environmental problems and/or hurdles as a result of the construction, maintenance, and use of the hydroelectric systems, which may often impact natural environmental waterways. Furthermore, the long commissioning time and the high risks make pumped storage hydroelectric systems less desirable. As such, the use and adoption of pumped storage hydroelectric systems has generally remained stagnant.

SUMMARY OF THE INVENTION

In accordance with the present invention, there is provided a pumped storage hydroelectric system including:
(a) a reservoir system including an upper reservoir system and a lower reservoir system, at least one of the upper reservoir system and the lower reservoir system including a modular reservoir arrangement, wherein the modular reservoir arrangement includes an array of modular tanks, the array of modular tanks including a plurality of modular tanks;
(b) a penstock coupled with the upper reservoir system;
(c) a pump/turbine coupled with the penstock and with the lower reservoir system, the pump/turbine configured to receive water flowing from the upper reservoir system to the lower reservoir system for generating electrical power, and pump water from the lower reservoir system to the upper reservoir system for storing energy; and
(d) a flow control system including a controller, a first fluid conductor fluidly connecting the penstock at a first location of the penstock to the upper reservoir system, a second fluid conductor fluidly connecting the penstock at a second location of the penstock to the lower reservoir system, a first valve interposed in the first fluid conductor, a second valve interposed in the second fluid conductor, the controller is configured to detect a first pressure indicated by a first pressure sensor at a first pressure sensor location of the penstock, the first valve, the second valve and the first pressure sensor are functionally connected to the controller, the first location of the penstock and the first pressure sensor location of the penstock are both uphill of the location of a control valve disposed to control a fluid flow through the penstock, the controller is further configured to control the first valve and the second valve in response to a pressure event based on at least one of the first pressure and a time derivative of the first pressure, in a response.

In one embodiment, the response is a response in which the first valve is controlled to be disposed in one of an open position and a closed position. In one embodiment, the response is a response in which the second valve is controlled to be disposed in one of an open position and a closed position. In one embodiment, the response is a response in which the first valve is controlled to be disposed in one of an open position and a closed position while the second valve is controlled to be disposed in a position opposite that of the position of the first valve. In one embodiment, the response is a response in which the first valve is controlled to be disposed in an open position to allow a flow through the first fluid conductor into the penstock. In one embodiment, the response is a response in which the second valve is controlled to be disposed in an open position to allow a flow through the second fluid conductor out of the penstock. In one embodiment, the controller is further configured to detect a second pressure at a second pressure sensor location and the controller is further configured to control the first valve and the second valve in response to the pressure event based additionally on the second pressure and a time derivative of the second pressure, in the response. In one embodiment, the first location of the penstock is the same as the second location of the penstock. In one embodiment, the first location of the penstock is a location of up to about two meters uphill of the control valve along the penstock.

An object of the present invention is to equip a pumped storage hydroelectric system with a pressure surge suppression function with existing equipment useful for enabling storage and transfer of fluid between tanks.

Another object of the present invention is to provide a surge suppression mechanism capable of anticipating a water hammer event and thereby lessening the extent to which the water hammer event develops.

According to an implementation, a pumped storage hydroelectric system may include a reservoir system including an upper reservoir system and a lower reservoir system. At least one of the upper reservoir system and the lower reservoir system may include a modular reservoir arrangement. The pumped storage hydroelectric system may also include a penstock coupled with the upper reservoir system. The pumped storage hydroelectric system may also include a pump/turbine coupled with the penstock and with the lower reservoir system. The pump/turbine may be configured to receive water flowing from the upper reservoir system to the lower reservoir system for generating electrical power. The pump/turbine may also be configured to pump water from the lower reservoir system to the upper reservoir system for storing energy.

One or more of the following features may be included. The modular reservoir arrangement may include one or more modular reservoir tanks fluidly coupled with one or more of the penstock and the pump/turbine. The one or more modular reservoir tanks may include standardized reservoir tanks. The one or more modular reservoir tanks include at least partially flexible tank bladders. The one or more modular reservoir tanks may include an array of modular tanks. The array of modular tanks may include a plurality of modular tanks separated, and at least partially supported by, earthen berms.

The pumped storage hydroelectric system may also include a surge suppression device in fluid communication with one or more of the penstock and the pump/turbine. The pump/turbine may be configured to receive at least a portion of power for pumping water from the lower reservoir system to the upper reservoir system from a renewable energy source. The renewable energy source may include a wind energy source including one or more wind turbines. The renewable energy source may include a solar energy source comprising a plurality of photovoltaic panels. At least a portion of the photovoltaic panels may be arranged to at least partially shade at least a portion of the reservoir system. The renewable energy source may include a solar energy source comprised of one or more solar ponds, equipped to produce electricity.

According to another implementation, a pumped storage hydroelectric system may include a scalable reservoir system. The scalable reservoir system may include an upper reservoir system including one or more upper modular reservoir tanks. The scalable reservoir system may also include a lower reservoir system including one or more lower modular reservoir tanks. The number of upper modular reservoir tanks and the number of lower modular reservoir tanks may be selected to provide a desired potential energy storage capacity. The pumped storage hydroelectric system may also include a penstock fluidly coupled with the upper reservoir system and the lower reservoir system. At least a portion of the penstock may include one or more of a polymer-based conduit and a composite conduit. The pumped storage hydroelectric system may also include a pump/turbine coupled with the penstock and the lower reservoir system for generating electricity during a flow of water from the upper reservoir system to the lower reservoir system, and for storing energy by pumping water from the lower reservoir system to the upper reservoir system. The pumped storage hydroelectric system may also include a surge protection device associated with one or more of the penstock and the pump/turbine.

One or more of the following features may be included. One or more of the upper modular reservoir tanks and the lower modular reservoir tanks may include semi-flexible bladder tanks. The upper modular reservoir tanks may include an array of bladder tanks. At least a portion of the array of bladder tanks may be separated by earthen berms to provide a generally mutually supporting arrangement of at least a portion of the bladder tanks. The lower modular reservoir tanks may include an array of bladder tanks. At least a portion of the array of bladder tanks may be separated by earthen berms to provide a generally mutually supporting arrangement of at least a portion of the bladder tanks.

The pumped storage hydroelectric system may include a UV mitigation arrangement associated with one or more of the upper reservoir system and the lower reservoir system. The UV mitigation arrangement may be configured to reduce UV exposure of at least a portion of the modular reservoir tanks.

At least a portion of energy for pumping water from the lower reservoir system to the upper reservoir system may be provided by one or more of a wind power source and a solar power source. The solar power source may include an array of photovoltaic panels. At least a portion of the array of photovoltaic panels may be arranged to at least partially reduce UV exposure of at least a portion of the modular reservoir tanks.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTICULAR ADVANTAGES OF THE INVENTION

Figure 1:
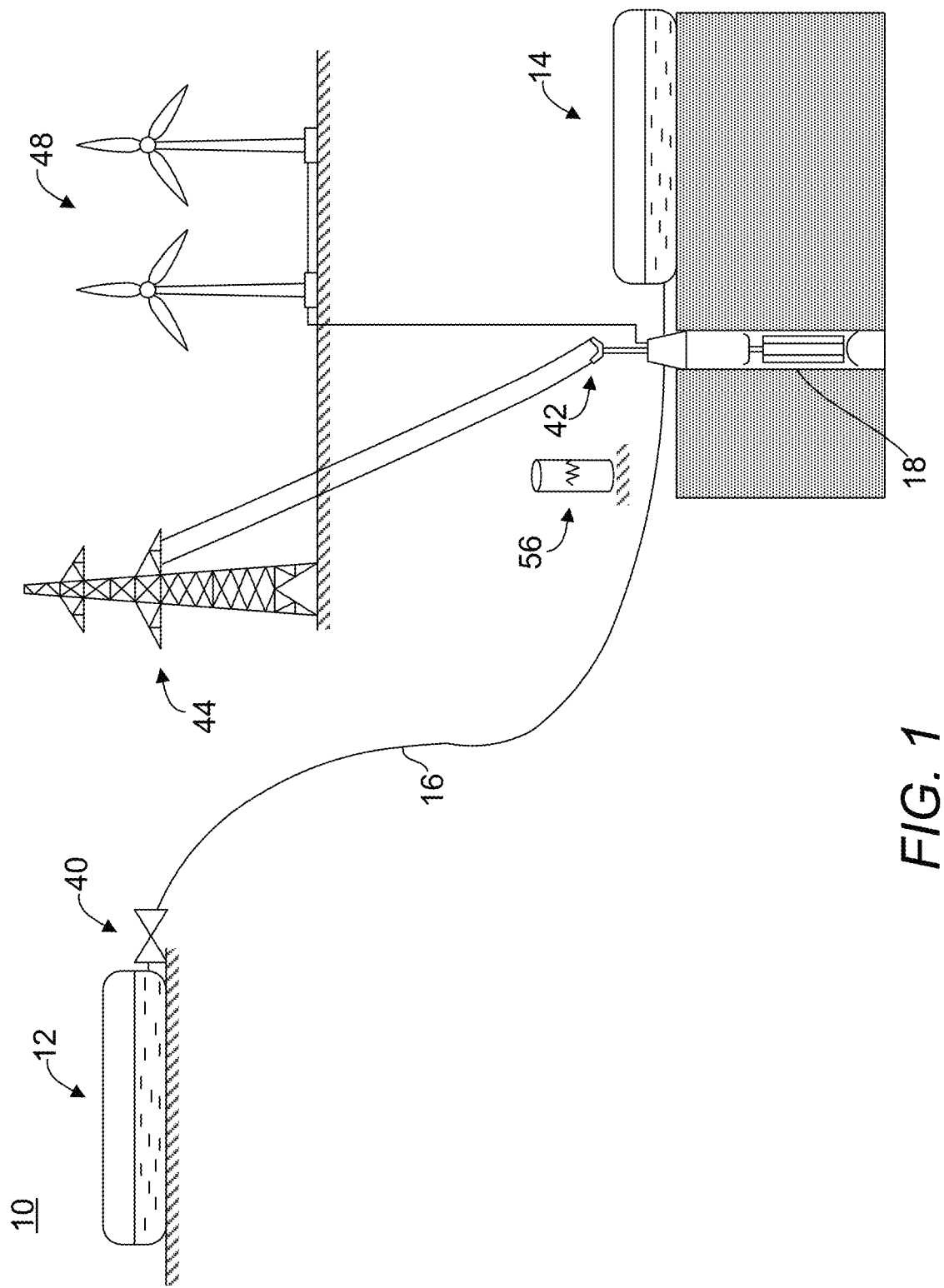
FIG. 1 diagrammatically depicts a pumped storage hydroelectric system, according to an example embodiment.

The present flow control system removes the need for a dedicated surge protection device, thereby reducing the cost of procuring and maintaining such a dedicated surge protection device. The present flow control system actively prevents a drastic pressure change event from developing into a full water hammer event, therefore reducing the possibility that a full-blown water hammer event can be realized, reducing the damaging effects water hammer events have on the pumped storage hydroelectric system.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

In general, the present disclosure relates to modular and scalable pumped storage hydroelectric systems. In general, the pumped storage hydroelectric system may include an upper reservoir system at a first elevation, and a lower reservoir system at a second, lower elevation. Water may be stored in the upper reservoir system, having stored potential energy relative to the lower reservoir system. The water may be permitted to flow from the upper reservoir system to the lower reservoir system via a penstock connecting the two reservoir systems. A pump/turbine may be disposed in the flow path, whereby the kinetic energy of the flowing water may be harvested by the pump/turbine via hydroelectric power generation, and the water may be collected in the lower reservoir system. Subsequently, the pump/turbine may pump the water from the lower reservoir system back up the penstock to the upper reservoir system, where the water may be again stored until additional power generation (in the manner described) is once again desired. Consistent with some implementations of the present disclosure, such a modular and scalable pumped storage hydroelectric system may reduce the costs for materials and construction of a pumped storage hydroelectric system, may increase the ease of installation, may expedite project development timeline, and/or may increase the operating efficiency of a pumped storage hydroelectric system. In some implementations, a modular and scalable pumped storage hydroelectric system consistent with the present disclosure may facilitate standardization of components, which may, for example, allow replication of similar pumped storage hydroelectric systems without requiring a complete system redesign. Additional and/or alternative features may be realized.

According to a general illustrative example embodiment consistent with the present disclosure, a pumped storage hydroelectric system may include a reservoir system including an upper reservoir system and a lower reservoir system. At least one of the upper reservoir system and the lower reservoir system may include a modular reservoir arrangement. Further, the pumped storage hydroelectric system may also include a penstock coupled with the upper reservoir system. The pumped storage hydroelectric system may also include a pump/turbine coupled with the penstock and with the lower reservoir system. The pump/turbine may be configured to receive water flowing from the upper reservoir system to the lower reservoir system for generating electrical power. The pump/turbine may also be configured to pump water from the lower reservoir system to the upper reservoir system for storing energy.

As generally mentioned, consistent with some embodiments, a pumped storage hydroelectric system may include a module, scalable, closed loop system. For example, consistent with the present disclosure, the system may be modular in that at least a portion of the components may be standardized, include a standardized range, and/or include standardized features. For example, one or more of the reservoir system, the penstock, and the pump/turbine may be standardized components, and/or include standardized features that may enable the components of the pumped storage hydroelectric system to be used, as-is, or with some degree of modification, for multiple different projects or site conditions. Consistent with such an aspect, the use of modular components may reduce the number of bespoke components that may be specifically designed for a given project or sight conditions. This may allow new installations or projects to be implemented without requiring a complete redesign of all aspects of the pumped storage hydroelectric system. In some implementations, some or all of the components may essentially be standardized or off-the-shelf components that may be appropriately assembled to provide a desired capacity of the pumped storage hydroelectric system and/or to fit a desired installation or work within a given site.

According to such an implementation, the use of modular components may make the construction of a pumped storage hydroelectric system consistent with the present disclosure faster and/or less expensive as compared to a bespoke design and construction.

Consistent with some example embodiments, a pumped storage hydroelectric system consistent with the present disclosure may include a closed loop configuration. For example, the upper reservoir and/or the lower reservoir may be generally isolated from natural and/or free flowing water sources, such as ponds, lakes, rivers, or the like. Consistent with some such implementations, a closed loop pumped storage hydroelectric system may generally not disturb or alter natural aquatic habitats. As such the ecological impact associated with a pumped storage hydroelectric system consistent with some embodiments of the present disclosure may be lower than, for example, pumped storage hydroelectric systems that may utilize natural and/or free flowing water sources.

Referring to FIG. 1, and illustrative example embodiment of a pumped storage hydroelectric system 10 consistent with the present disclosure is depicted. The pumped storage hydroelectric system 10 may include a reservoir system including an upper reservoir system 12 and a lower reservoir system 14. Consistent with the illustrated example embodiment, the pumped storage hydroelectric system 10 may also include a penstock 16 coupled with the upper reservoir system 12. Further, the pumped storage hydroelectric system 10 may also include a pump/turbine 18 coupled with the penstock 16 and with the lower reservoir system 14. The pump/turbine 18 may be configured to receive water flowing from the upper reservoir system 12 to the lower reservoir system 14 for generating electrical power. The pump/turbine 18 may also be configured to pump water from the lower reservoir system 14 to the upper reservoir system 12 for storing energy. Various additional and/or alternative features may also be included.

As generally discussed above, consistent with the illustrated example embodiment, the pumped storage hydroelectric system 10 may include a reservoir system including an upper reservoir system 12 and a lower reservoir system 14. Further, consistent with some embodiments, at least one of the upper reservoir system 12 and the lower reservoir system 14 may include a modular reservoir arrangement. For example, at least one of the upper reservoir system 12 and the lower reservoir system 14 may include one or more modular reservoir tanks, which may be fluidly coupled with one or more of the penstock 16 (e.g., in the case of the upper reservoir system 12) or the pump/turbine 18 (e.g., in the case of the lower reservoir system 14). Consistent with some embodiments, the modular reservoir tanks may include generally self-contained structures, e.g., which may define the volume of the reservoir tanks. In some implementations, the reservoir tanks may include fully enclosed structures and/or at least partially enclosed structures. In some such implementations, the reservoir tanks may by fully and/or substantially enclosed. Consistent with such a configuration, evaporative losses from the reservoir tanks may be reduced and/or eliminated. In a configuration in which both the upper reservoir system 12 and the lower reservoir system 14 include fully and/or substantially enclosed reservoir tanks, the pumped storage hydroelectric system 10 may define a closed-loop system, e.g., in which the operation of the system may not be dependent upon natural and/or environmentally obtained water for continuing operation of the system. It will be appreciated that even with a closed-loop system, there may still be some losses (e.g., due to spills, leakage, etc.) which may require periodic and/or ongoing replenishment to maintain the system at full capacity. Additionally, it will be appreciated that while at least one of the upper reservoir system and the lower reservoir system may include a modular reservoir tank, at least one of the upper reservoir system and the lower reservoir system may include a manmade and/or natural reservoir, such as a lake, pond, or the like. In some such implementations, the manmade and/or natural reservoir may be at least partially open to the environment. However, in some such implementations, the manmade and/or natural reservoir may be at least partially isolated from the surrounding environment to reduce and/or mitigate ecological impact.

Consistent with some embodiments of the present disclosure, in which one or more of the upper reservoir system 12 and the lower reservoir system 14, may include one or more modular reservoir tanks, the one or more modular reservoir tanks may include standardized reservoir tanks. For example, as generally discussed above, consistent with some implementations the use of modular components and/or modular features may facilitate design, construction, and/or maintenance of the pumped storage hydroelectric system 10, e.g., at least in part because the modular components and/or features may include standard and/or off-the-shelf components. Standard and/or off-the-shelf components may generally include components that have a standard design or configuration (e.g., may not have been designed for a particular pumped storage hydroelectric installation and/or may be susceptible to use in more than one different pumped storage hydroelectric installation), that may be a manufactured and stocked component, that may be manufactured on demand to pre-existing design criteria, or the like.

Consistent with one particular illustrative example embodiment, a modular reservoir tank may have a standard size and configuration, which may be susceptible to use in both the upper reservoir system 12 and the lower reservoir system 14, that may be susceptible to use at more than one different pumped storage hydroelectric installation, and/or may be designed for and/or susceptible to uses other than pumped storage hydroelectric reservoir systems. In one such embodiment, a modular reservoir tank may include, for example, a tank being approximately 70 feet by approximately 77 feet by approximately 6 feet, providing an approximate capacity of 210,000 gallons. It will be appreciated, however, that the foregoing is intended for the purpose of illustration, and not limitation, as other dimensions and capacities of the modular reservoir tanks may be equally utilized depending upon design criteria, and the like, Further, it will be appreciated that different sizes of reservoir tanks may be utilized in a single pumped storage hydroelectric system. For example, the upper reservoir system may utilize reservoir tanks having a different size and/or configuration from reservoir tanks utilized in the lower reservoir system. Further, one, or both, of the upper reservoir system and the lower reservoir system may include more than one reservoir tank. When more than one reservoir tank is utilized, the reservoir tanks may include more than one reservoir tank size and/or configuration.

It will be appreciated that the reservoir tanks may be constructed from a variety of materials and utilizing a variety of materials. For example, the modular reservoir tanks may be constructed from any suitable metal (steel, aluminum, etc.), cast concrete, polymeric materials (polyethylene, PVC, ABS, acrylic, PET, nylon, polycarbonate, urethane, various rubber or elastomeric materials, etc.), composite materials (e.g., fiberglass, carbon fiber, aramid fiber, etc., reinforced epoxy, polyester, nylon, or other suitable thermoset or thermoplastic material). It will also be appreciated that the modular reservoir tanks may be constructed as a prefabricated unit, and/or may include a plurality of prefabricated components that may be at least partially assembled on-site of the pumped storage hydroelectric system installation.

Consistent with some implementations, the one or more modular reservoir tanks may define generally rigid tanks having a generally fixed configuration. According to some implementations, the one or more modular reservoir tanks (e.g., one or more of the upper modular reservoir tanks and the lower modular reservoir tanks) may include at least partially flexible tank bladders/semi-flexible bladder tanks. Consistent with an illustrative example embodiment, a bladder tank may include a generally flexible material, such as rubber and/or elastomeric material. The generally flexible material may include various reinforcing structures (such as reinforcing cords, strands, meshes, etc.) which may be incorporated within the body of the flexible material, and/or may be disposed on an exterior of the generally flexible material. Consistent with such an implementation, the configuration and/or one or more dimension of the bladder tanks may vary depending upon how full the bladder tank is. For example, the bladder tank may define a lower volume when empty as compared to when the bladder tank is filled. Additionally, in some implementations, the use of at least semi-flexible bladder tanks may facilitate transporting the reservoir tanks to the installation site of the pumped storage hydroelectric system. For example, the bladder tanks may be folded, rolled, or otherwise reduced in at least one dimension, which may facilitate transporting the bladder tanks via truck, or other suitable transport means.

In some implementations, a pumped storage hydroelectric system consistent with the present disclosure may have a scalable capacity. For example, the power generating capacity of a given modular pumped storage hydroelectric system consistent with the present disclosure may be designed into the system to achieve a desired design criterion, to suit a given need served by the pumped storage hydroelectric system, and/or based upon, at least in part, the attributes of the installation site. For example, the electrical generating capacity of the pumped storage hydroelectric system 10 may be generally based upon the potential energy of the water stored in the upper storage reservoir system 12. The potential energy of the water stored in the upper reservoir system 12 may be based upon the mass of the water stored in the upper reservoir system (e.g., which may generally correspond to the volume of the water in the upper reservoir system) and the head, or elevation of the upper reservoir system 12 relative to the elevation of the lower reservoir system 14. As such, the available electricity generating capacity of the pumped storage hydroelectric system 10 may be scaled up by increasing the storage capacity of the upper reservoir system 12 (and correspondingly increasing the storage capacity of the lower reservoir system 14, which may typically be sized generally the same as the upper reservoir system) and/or by increasing the head (i.e., the elevation of the upper reservoir system relative to the lower reservoir system). It will be appreciated that the head may, in some situations, be generally dictated by the installation site and may not be susceptible to a great deal of control The available electricity generating capacity of the pumped storage hydroelectric system may be scaled down in the converse manner (i.e., decreasing the storage capacity of the upper reservoir system and/or decreasing the head). Consistent with some implementations, a pumped storage hydroelectric system consistent with the present disclosure may be readily susceptible to electricity generating capacities between about 0.1 MW to about 10 MW. However, it will be appreciated that, based upon the principles herein, the system may be scaled to provide larger or smaller capacities.

Continuing with the foregoing, and consistent with the present disclosure, a pumped storage hydroelectric system may include a scalable reservoir system. As generally discussed above, the electricity generating capacity of the pumped storage hydroelectric system 10 may be scaled, according to one possibility, by scaling the reservoir system capacity/volume (e.g., increasing the upper reservoir system capacity to increase the electricity generating capacity, or decreasing the upper reservoir system capacity to decrease the electricity generating capacity, with the lower reservoir system capacity being sized to accept the water from the upper reservoir system). According to various implementations, scaling the reservoir system may include increasing (or decreasing) the size of the individual modular reservoir tanks and/or increasing (or decreasing) the number of modular reservoir tanks in the reservoir system.

Consistent with an illustrative example embodiment, the scalable reservoir system may include an upper reservoir system including one or more upper modular reservoir tanks. The aggregate volume of the one or more upper reservoir tanks may be selected to provide a desired electricity generating capacity (e.g., which may also be based upon, at least in part, the system head), and/or based upon the physical characteristics of the pumped storage hydroelectric system installation site. Correspondingly, the scalable reservoir system may also include a lower reservoir system including one or more lower modular reservoir tanks. The upper and lower reservoir systems may include the same number of reservoir tanks or a different number of reservoir tanks. In some implementations, the upper and lower reservoir systems may include the same number of tanks of the same volume. In some implementations, the upper and lower reservoir systems may include a different number of tanks and/or tanks of a different volume. It will be appreciated that while the capacity of the upper reservoir system may, at least in part, determine the maximum available potential energy of the water stored therein, the amount of energy that can be realized may be limited by the lower reservoir system, e.g., if the lower reservoir system does not have the capacity to accept all of the water from the upper reservoir system. Consistent with the foregoing, in an example embodiment, the number of upper modular reservoir tanks and the number of lower modular reservoir tanks may be selected to provide a desired electrical energy storage capacity (i.e., storage of an amount of water capable generating a desired amount of electricity, in consideration of the available head and the efficiency of the system).

Figure 2:
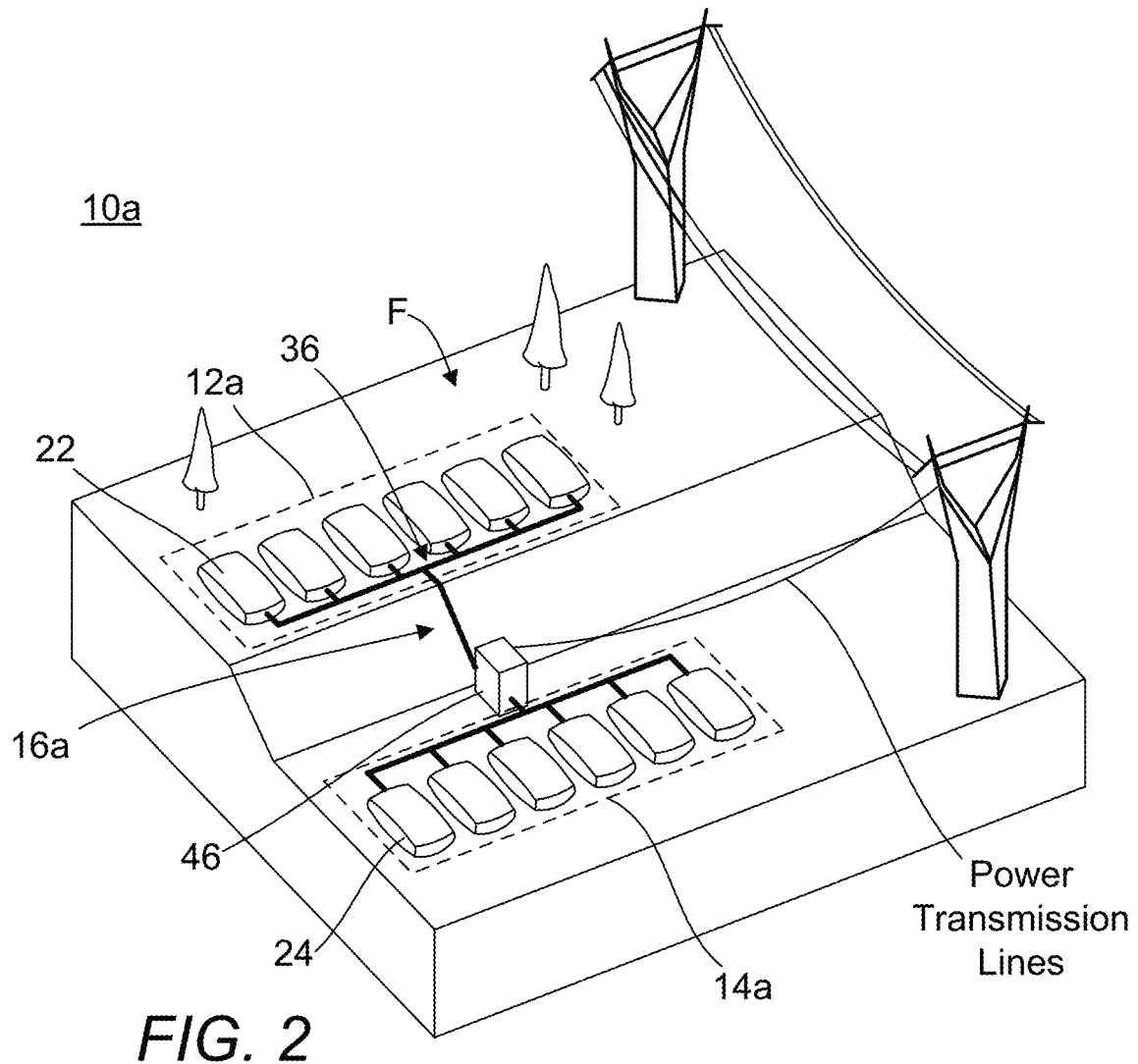
FIG. 2 diagrammatically depicts a pumped storage hydroelectric system including an array of upper reservoir tanks and an array of lower reservoir tanks, according to an example embodiment.

Referring also to FIG. 2, consistent with an illustrative example embodiment, the one or more modular reservoir tanks (e.g., one or more modular reservoir tanks 22 of the upper reservoir system 12*a* and/or one or more of modular reservoir tanks 24 of lower reservoir system 14*a*) may include an array of modular tanks, as shown for each of the respective upper reservoir system 12*a* and lower reservoir system 14*a*. The aggregate volume of the array of modular reservoir tanks (e.g., modular reservoir tanks 22, 24) of respective upper reservoir system 12*a* and lower reservoir system 14*a* may be selected to provide a desired capacity of the pumped storage hydroelectric system 10*a* (with consideration given to available head of the system). As generally mentioned, the system may be readily scaled to provide a capacity range of between about 0.1 MW to about 10 MW, utilizing reservoir systems including an array of between about 1 reservoir tank to about 200 reservoir tanks for each of the upper and lower reservoir system, e.g., in the illustrative example embodiment in which each tank may have a volume of about 210,000 gallons. It will be appreciated that a larger or smaller capacity may be achieved, and that the possible capacity may also be dictated, at least in part, upon the physical characteristics of the installation site (e.g., available land for the array of the upper reservoir system and the lower reservoir system, and the relative elevation difference therebetween).

Figure 3:
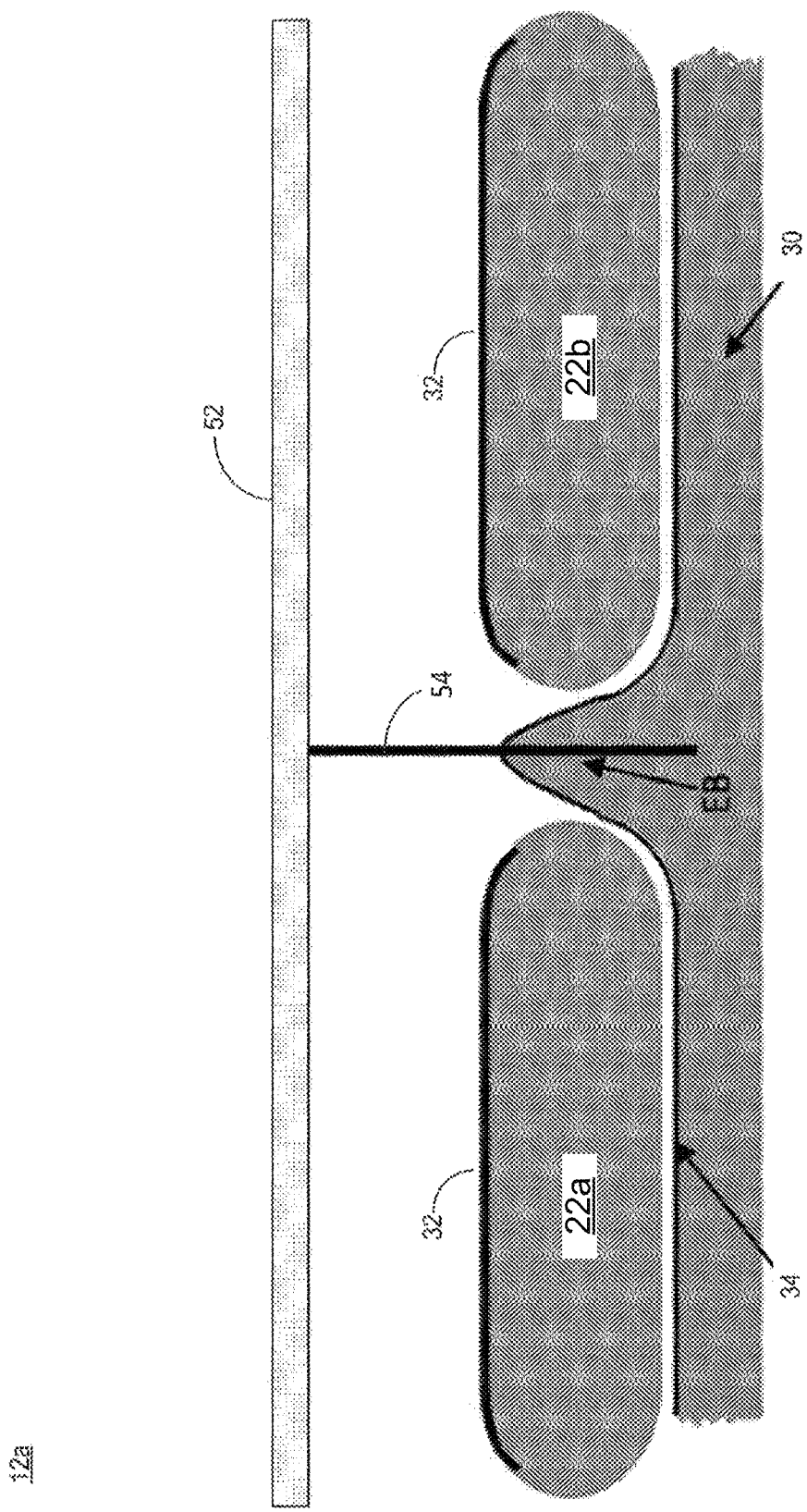
FIG. 3 diagrammatically depicts a reservoir tank installation configuration, according to an example embodiment.

As generally discussed above, the reservoir tanks may include generally rigid reservoir tanks and/or at least partially or semi-flexible tanks (e.g., bladder tanks). In either configuration, it will be appreciated that, particularly when the tanks provide a significant storage volume, the tanks may experience a relatively large mechanical stress. In some embodiments consistent with the present disclosure, the pumped storage hydroelectric system may include reservoir systems that may be configured to at least partially alleviate some of the mechanical stress on the individual reservoir tanks. Consistent with an illustrative example embodiment, at least a portion of an array of modular tanks (e.g., bladder tanks) may be at least partially separated by earthen berms to provide a generally mutually supporting arrangement of at least a portion of the bladder tanks. For example, and with reference also to FIG. 3, a portion of upper reservoir system 12*a* is shown for illustrative purposes. As shown, upper reservoir system 12*a* may include an array of reservoir tanks including at least bladder tanks 22*a* and 22*b*. As generally described above, bladder tanks 22*a*, 22*b* may generally include at least partially flexible bladder tanks (e.g., which may be formed from a reinforced rubber membrane, or other suitable material). As shown, adjacent bladder tanks 22*a*, 22*b* may be at least partially separated by an earthen berm EB. In some implementations, the earthen berm may be formed from native soil 30 of the installation site, which may be excavated or shaped to form earthen berms between adjacent bladder tanks. In some implementations, the earthen berm may at least partially support bladder tanks 22*a*, 22*b*, e.g., including the bladder tanks 22*a*, 22*b* to support each other through the normal forces of each bladder tank 22*a*, 22*b* transmitted to the other bladder tank via the earthen berm EB. Consistent with some embodiments, the ability to reduce the mechanical stresses on the bladder tanks through the use of the earthen berms and the mutually supporting configuration may prolong the useful life of the bladder tanks. It will be appreciated that a similar configuration may be implemented in connection with the lower reservoir system. Further, it will be appreciated that while only two tanks are depicted FIG. 3, that a similar configuration may be utilized for a greater number of tanks, including for a configuration including multiple rows and columns of bladder tanks, with respective earthen berms between adjacent tanks within a common row and between adjacent tanks in within a common column. Other similar arrangements may be equally utilized.

Consistent with some implementations, the pumped storage hydroelectric system may include a UV mitigation arrangement associated with one or more of the upper reservoir system and the lower reservoir system. The UV mitigation arrangement may be configured to reduce UV exposure of at least a portion of the modular reservoir tanks.

That is for example, the UV mitigation arrangement may at least partially shade one or more of the modular reservoir tanks, thereby reducing the UV exposure of the tanks. Reducing the UV exposure of one or more of the tanks may, for example, extend the useful service life of the tanks. With continued reference to FIG. 3, consistent with some implementations, reservoir tanks 22a, 22b may be covered by shade cloths 32, which may include any suitable fabric, textile, sheeting, or the like, which may block at least a portion of the UV radiation reaching the reservoir tanks. At least partially reducing, and/or substantially blocking, UV radiation on the reservoir tanks may increase the useful service life of the tanks, e.g., by reducing and/or slowing UV degradation of the tank material. Further, as shown, in some implementations a geotextile membrane 34 may be disposed between the reservoir tanks and the soil 30. In some situations, the geotextile membrane may provide some degree of protection for the reservoir tanks, and may extend the useful service life of the reservoir tanks. As shown, in some embodiments the geotextile material may extend at least partially onto the earthen berm EB, and may even completely cover the earthen berm.

As discussed above, the pumped storage hydroelectric system 10 may also include a penstock 16 coupled with the upper reservoir system 12. As shown in FIG. 2, in some implementations, in which the upper reservoir system 12a may include more than one reservoir tank, the upper reservoir system 12a may include a manifold 36, or other connection between the individual reservoir tanks and the penstock 16a. Consistent with some embodiments, at least a portion of the penstock may include one or more of a polymer-based conduit and a composite-based conduit (herein generally referred to as a polymer/composite-based material). For example, the penstock may be, entirely and/or partially, made from a polymer-based material, such as HDPE, cross-linked polyethylene, PVC, and/or any other suitable polymer based material and/or composite material (such as a fiberglass, carbon fiber, aramid fiber, etc. reinforced thermoplastic and/or thermoset material). Consistent with such an implementation, the polymer/composite-based penstock may provide a relatively low cost and light weight material that may exhibit a relatively high fatigue life. Further, in some situations a polymer/composite-based penstock may help dampen vibrations (e.g., as may be caused by sudden hydraulic events such as water hammers).

Consistent with an illustrative example embodiment, the polymer/composite-based penstock may be on the order of 18 inches in diameter, however it will be appreciated that other penstock pipe sized may be utilized. Further, and as shown in the example embodiment illustrated in FIG. 2, in some implementations greater capacity may be provided by, e.g., implementing a dual, parallel penstock 16a, which may include two generally parallel penstock pipes extending from the upper reservoir system 12a. Other penstock sizes and/or aggregate sizes (e.g., as may be provided through the use of multiple penstocks, such dual, parallel penstocks, or even greater number of penstocks) may be utilized to provide a desired flow capacity and/or to supply more than one pump/turbine. It will be appreciated that while the penstock may include a polymer/composite-based material, in some situations, e.g., in which the penstock may experience relatively high hydraulically and/or thermally induced stresses, some and/or all of the penstock may include metal piping (e.g., such as steel piping). The use of an at least partially metal penstock may be necessary, for example, in a pumped storage hydroelectric system having a sufficiently large hydraulic head. As such, the present disclosure contemplates the use of a penstock including a combination of metal piping and polymer/composite-based piping, as well as a penstock including only metal piping.

Figure 4:
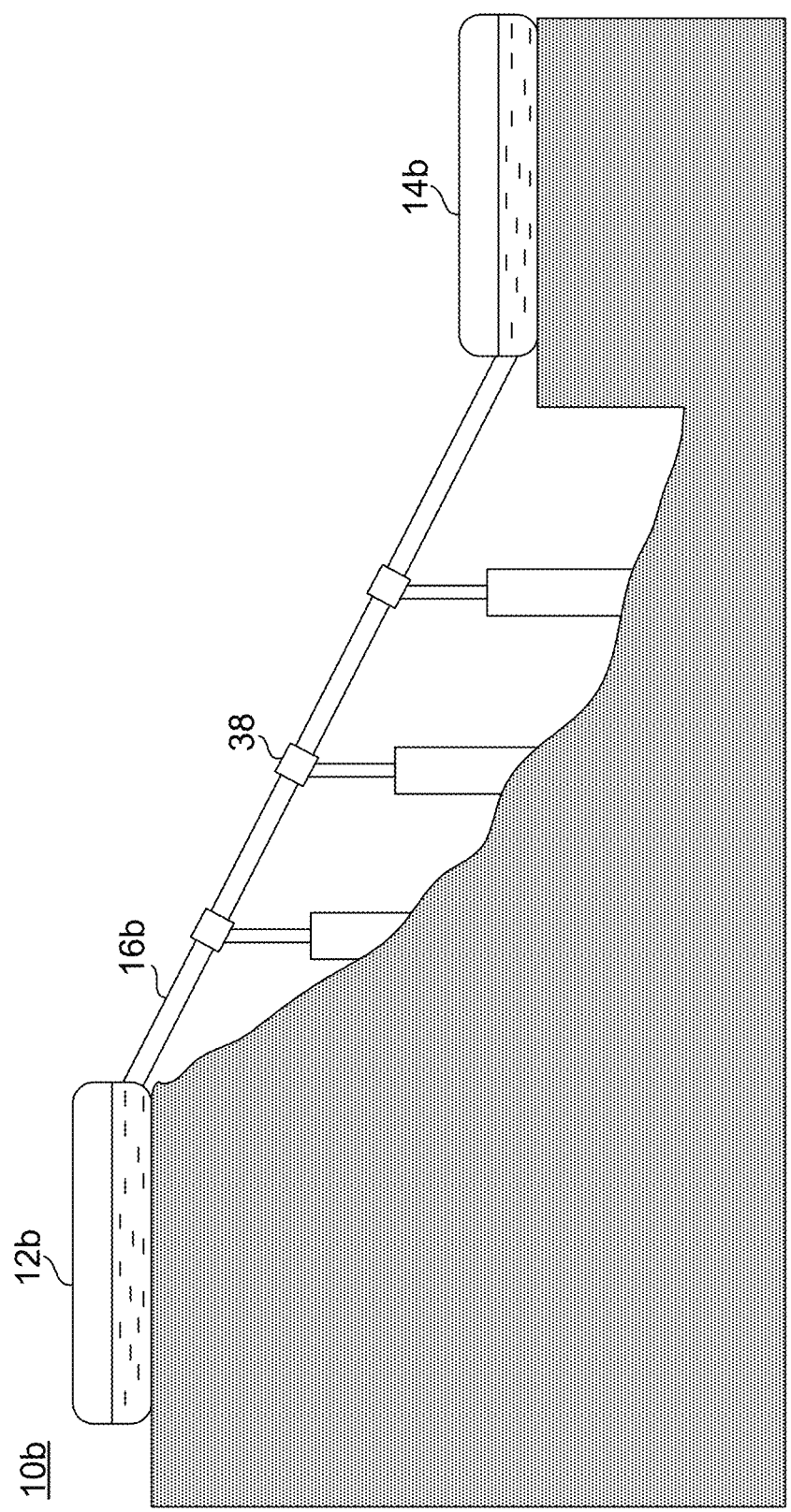
FIG. 4 diagrammatically depicts a pumped storage hydroelectric system including an above ground penstock arrangement, according to an example embodiment.

Consistent with some implementations, the penstock piping may be generally run above ground. Such an arrangement may greatly reduce the construction cost of the pumped storage hydroelectric system. For example, referring to FIG. 4, an illustrative example embodiment of a pumped storage hydroelectric system 10b is shown including above ground penstock 16b extending between an upper reservoir system 12b and a lower reservoir system 14b (for the purpose of clarity and simplicity intervening equipment, such as a pump/turbine, etc., have been omitted from the depicted system). As shown, the above ground penstock 16b may be supported by one or more supports (e.g., support 38). In some implementations, it may be possible for at least, if not all or a substantial portion of, the penstock to be directly ground supported (i.e., to be in direct contact with the ground). Additionally, while the present disclosure contemplates the use of an above ground penstock, it will be appreciated that in locations that may experience low ambient temperatures for at least a portion of the year, it may be necessary to bury the penstock to prevent freezing.

With continued reference, e.g., to FIG. 1, the pumped storage hydroelectric system 10 may also include a pump/turbine 18 coupled with the penstock and with the lower reservoir system. The pump/turbine may be configured to receive water flowing from the upper reservoir system to the lower reservoir system for generating electrical power. That is, the kinetic energy of the water flowing from the upper reservoir system 12, via the penstock 16, may rotationally power a turbine of the pump/turbine 18, which, in turn, powers an electric generator for generating electricity. After passing through the pump/turbine 18, the water may be collected in the lower reservoir system 14. As generally schematically shown in FIG. 1, the pumped storage hydroelectric system 10 may include one or more valves (e.g., valve 40) and various other control systems (e.g., including, but not limited to, various valves, level sensors, flowmeters, PLCs, etc.) to control the system which may, for example, selectively control the flow of water from the upper reservoir system 12 to the pump/turbine unit 18. Additionally, the pumped storage hydroelectric system 10 may include appropriate switching gear 42 for connecting the pump/turbine (which may include the electrical generator) with power transmission and/or distribution system 44, such as a utility grid, a micro-grid (e.g., an electrical transmission and/or distribution system for a factory, manufacturing plant, neighborhood, or other power grid covering a smaller scale than a public utility grid).

Additionally, the pump/turbine 18 may also be configured to pump water from the lower reservoir system 14 to the upper reservoir system 12 for storing energy. Consistent with an illustrative example embodiment, the pump/turbine 18 may include a high performance pump/turbine unit, e.g., in which the same pump/turbine can generate electricity during the flow of water from the upper reservoir system 12 and pump water from the lower reservoir system 14 back up to the upper reservoir system. Further, in some illustrative example embodiments, the pump/turbine 18 may include a high performance pump/turbine that may not require a subterranean structure, but rather may simply be positioned in a lined well casing, or even at or near ground level, in some implementations. Typically, reversible pump turbines may be positioned a relatively significant depth below tailwater lever, often in an underground powerhouse. The required depth below tailwater level submergence requirements may be necessary to prevent cavitation that could potentially damage the turbine. Construction and maintenance of such facilities are not only extremely costly, but also rely upon appropriate geological characteristics of the site. Consistent with some embodiments of the present disclosure, high performance pump/turbines may require a relatively small head between the lower reservoir system 14 and the pump/turbine (e.g., depth below tailwater) to efficiently pump water from the lower reservoir system 14 to the upper reservoir system 12 without experiencing undesired and/or damaging cavitation. As noted, such a high performance pump/turbine may be located within a vertical well, which may provide sufficient depth below tailwater to prevent cavitation. Such a well may be relatively low cost, and may be much less dependent upon geological attributes of the site, as compared to an underground powerhouse. Consistent with some implementations, the required depth of the well casing may be determined by capacity of the pump/turbine. While the illustrated depiction only shows a single pump/turbine, it will be appreciated that this is for the purposes of clarity. Consistent with some implementations, a pumped storage hydroelectric system according to the present disclosure may include more than one pump/turbine unit. As generally shown, e.g., in FIG. 2, the pumped storage hydroelectric system 10 a may include a pump house 46, e.g., which may be positioned over the well casing including the pump/turbine. In some implementations, the pump house may also house the control systems associated with the pumped storage hydroelectric system, such as control systems for any valves and flow control devices associated with the system, switching gear and electronics for interfacing with the utility grid or micro-grid, or the like.

In general, the overall cost effectiveness of the pumped storage hydroelectric system may be increased by, e.g., generating electricity when there is a high demand (and, in some situations, a correspondingly higher per unit price), such as during the day, or other peak demand times. Similarly, water may be pumped from the lower reservoir system to the upper reservoir system during times that the per unit cost is relatively lower (e.g., such as at night or other off-peak times). Additionally, consistent with the present disclosure, in some embodiment, the pump/turbine may be configured to receive at least a portion of power for pumping water from the lower reservoir system to the upper reservoir system from a renewable energy source. For example, utilizing renewable energy sources to power at least a portion of pumping operation may offset the round-trip energy losses of the pumped storage hydroelectric system, and, in some implementations, may significantly offset the round-trip energy losses. Further, as many renewable energy sources may not provide continuous power generation, the pumped storage hydroelectric system may provide a storage mechanism, which may allow a power grid (e.g., utility grid, micro-grid, etc.) to realize a more uniform and continuous supply of electricity. For example, electricity may be provided by the renewable energy sources when they are generating, and electricity may be provided during at least a portion of the time during which the renewable energy sources are not generating.

Additionally, in an implementation in which the pumped storage hydroelectric system is an integrated part of a renewable energy source power system, electricity for pumping water for storage may not result in a stand alone cost of purchasing electricity (e.g., may only be a lost opportunity cost, as energy used to pump water for storage may not be utilized for paying customers, or other uses). In some implementations, the renewable energy sources may be dedicated to the pumped storage hydroelectric system (e.g., the renewable energy sources may be intended, at least in part, for powering the pumped storage aspect of the system, and/or the pumped storage hydroelectric system may be an integrated part of the renewable energy source power grid). Further, in some implementations, the renewable energy power source grid may provide a power source of convenience for the pumped storage operation.

Figure 5:
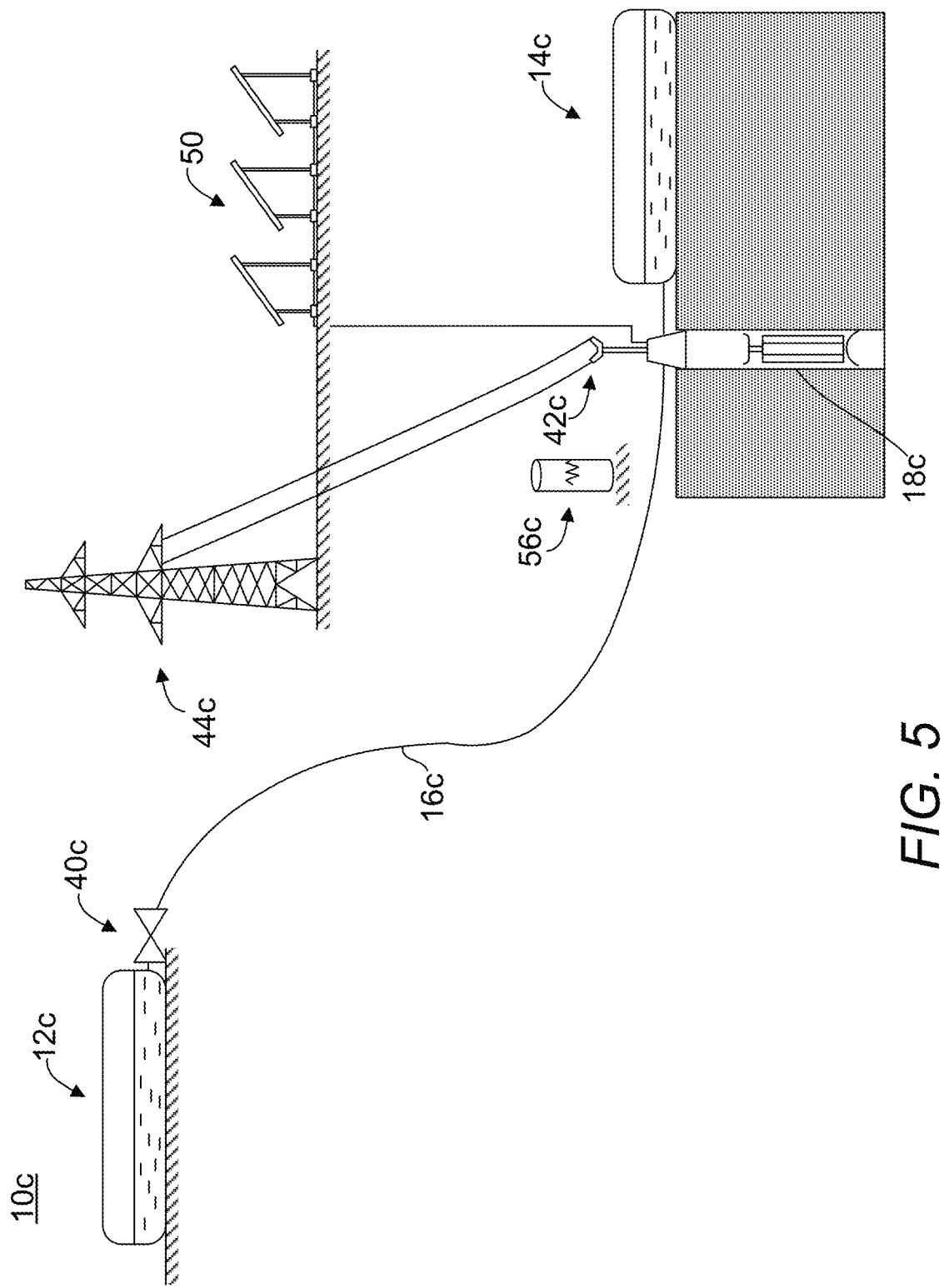
FIG. 5 diagrammatically depicts a pumped storage system according to an example embodiment.

The renewable energy source may include a wind energy source including one or more wind turbines. For example, and referring to FIG. 1, in an illustrative example embodiment, the pumped storage hydroelectric system 10 may be configured to receiving electricity from a wind energy source, such as wind turbines 48, generally. Additionally, and/or alternatively, the renewable energy source may include a solar energy source comprising a plurality of photovoltaic panels, or in some cases one or more solar ponds equipped for electricity generation. For example, and referring also to FIG. 5, and illustrative example embodiment of a pumped storage hydroelectric system 10c is depicted that is coupled with a solar energy power source. As shown, the solar power source may include an array of photovoltaic panels 50. As generally discussed above, in some embodiments, it may be advantageous to at least partially shade one or more of the reservoir tanks (e.g., the reservoir tanks of the upper reservoir system 12c and/or of the lower reservoir system 14c). Providing such at least partial shading may, at least in part, reduce the UV exposure experienced by at least some of the reservoir tanks, which may correspondingly increase the useful service life of the reservoir tanks.

Consistent with some such embodiments, and in an implementation which may utilize a solar power source, at least a portion of the photovoltaic panels may be arranged to at least partially shade at least a portion of the reservoir system. For example, and with reference to FIG. 3, when the solar power source includes an array of photovoltaic panels (e.g., including photovoltaic panels 52), at least a portion of the array of photovoltaic panels may be arranged to at least partially reduce UV exposure of at least a portion of the modular reservoir tanks. For example, as shown, photovoltaic panel 52 may be supported at least partially over, and shading, bladder tanks 22a, 22b, by way of support structure 54, which may include one or more support poles, gantries, and/or any other suitable support structure. Additionally, locating at least a portion of a solar photovoltaic array over at least a portion of one, or both, of the upper reservoir system and the lower reservoir system may improve the space efficiency of the pumped storage hydroelectric system, e.g., as separate acreage may not be required for the solar energy source and for the pumped storage hydroelectric system. Consistent with yet another implementation, the solar energy power source may be one or more solar ponds equipped for electricity generation. Consistent with some such implementations, the pumped storage hydroelectric system may provide for both thermal and mechanical energy storage.

While various foregoing implementations have related to the use of renewable energy sources to power the pumped storage process, it will be appreciated that other options may equally be utilized. For example, as generally discussed above, the power for the pumped storage process may be obtained from a conventional utility grid and/or other suitable energy source such as a nuclear micro reactor.

Consistent with the present disclosure, in some embodiments, the pumped storage hydroelectric system may also include a surge protection device associated with one or more of the penstock and the pump/turbine. For example, various hydraulic pressure transients, such as water hammer, may occur during various stages of operation of the pumped storage hydroelectric system. Such hydraulic pressure transients can be damaging to the system, and/or otherwise undesirable. Accordingly, in some implementations, and as shown, e.g., in FIG. 1, the pumped storage hydroelectric system 10 may include a surge suppression device 56 in fluid communication with one or more of the penstock 16 and the pump/turbine 18. It will be appreciated that the surge suppression device may be located at other points along the system, and further that the pumped storage hydroelectric system may include more than one surge suppression device. In some embodiments consistent with the present disclosure, the surge suppression device may include a modular surge protection design. Further the surge suppression device may include a surge tank, which may be equipped with a self-adaptive auxiliary control (SAC) or other surge suppression device, which may optimize surge tank response to transient pressure, and provide more effective dampening. In some implementations, a SAC may reduce the size of the required surge tank, contributing to modularity of pumped storage hydroelectric systems consistent with the present disclosure.

Consistent with the foregoing, the present disclosure may provide a pumped storage hydroelectric system. In some implementations, the pumped storage hydroelectric system may not rely on natural bodies of water and/or open or dug reservoirs or lakes. As such, the environmental and/or ecological impact of a system consistent with the present disclosure may be reduced compared to conventional systems. In some implementations, a system consistent with the present disclosure may be attractive to industries that require large amounts of electricity, such as manufacture of aluminum, steel, plastics, and paper and/or for abandoned mine reclamation. For example, such a system may allow industries to optimize their generation and purchase of electricity, by providing the ability to store significant quantities of energy (e.g., which may be utilized during peak electricity rate hours and/or during lulls of electricity production from renewable energy sources). As such, energy may be stored by pumping during off-peak rate hours, and may be generated to offset at least some of the costs of peak rate hours. Additionally, in some implementations consistent with the present disclosure, renewable energy sources may be utilized to offset losses, thereby increasing the overall efficiency of the system, further reducing operating costs and/or increasing the benefits during peak rate hours.

Consistent with the present disclosure, in some implementations a pumped storage hydroelectric system may be provided which may be one or more of a closed-loop, modular, and scalable. As such, the costs of materials and construction may be reduced, and the design and installation complexity may be reduced, e.g., which may expedite project and development timelines, and may increase operating efficiency. Also, as the system may be installed in modules, it may be more attractive for manufacturing, deployment, and assembly. Additionally, some systems consistent with the present disclosure may facilitate standardization of components/modules, which may allow the replication of similar systems (have variously scaled capacities) without requiring complete redesign. Further the capacity to utilize renewable energy sources for pumped storage operations may greatly reduce environmental impacts and increase overall system efficiency. Such systems may also be capable of compensating for the intermittency of renewable energy sources, such as wind and solar, by providing output during lulls in renewable generation.

A surge suppression or protection device, e.g., the one shown as part 56 in FIG. 1, absorbs pressure fluctuations, created by upset conditions, such as instantaneous load shedding or a control valve slamming shut due to some failure, be it electrical or mechanical. These upset conditions create a transient pressure wave which oscillates in the penstock 16, which is typically referred to as a water hammer. The effect felt on the penstock 16 and other equipment fluidly connected to the penstock 16 are typically strong positive and negative pressure fluctuations. The intensity of the fluctuations is maximized at the location in the system where the average pressure is highest. In one embodiment, a surge suppression device is a surge tank. A typical minimum operating water level in the surge tank is about 1-2 feet of water. The tank suppresses positive pressure spikes by absorbing most of the energy in the pressure spike. When the fluctuating pressure is negative water flows from the tank into the pipe to which the tank is connected to raise the negative pressure.

Figure 6:
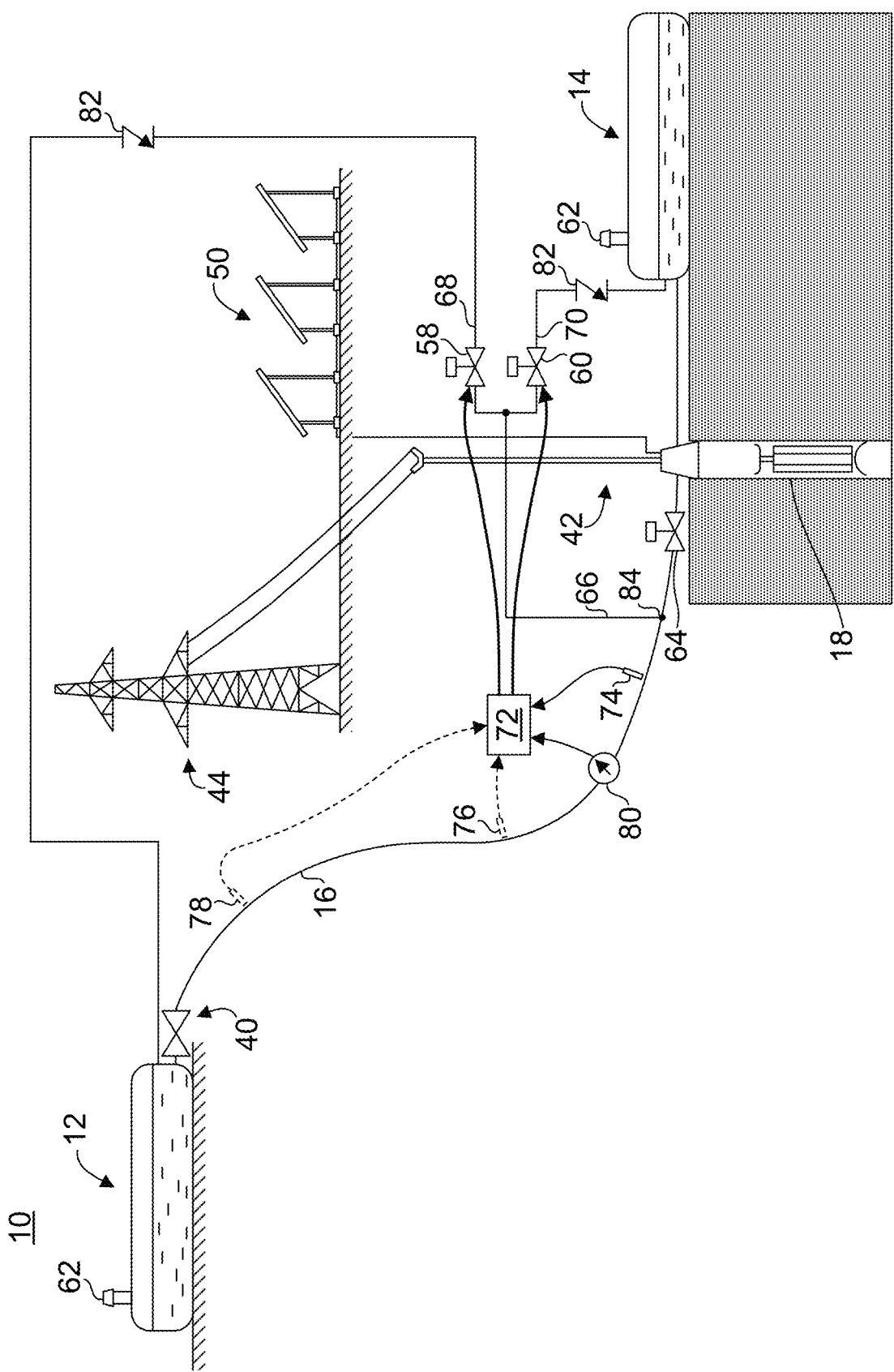
FIG. 6 is a diagram depicting a pumped storage hydroelectric system including a flow control system useful for mitigating water hammer events.

FIG. 6 is a diagram depicting a pumped storage hydroelectric system including a flow control system useful for mitigating water hammer events. Instead of using a dedicated surge protection device as disclosed elsewhere herein, a tank, e.g., a modular tank of the upper reservoir system may be fluidly connected to a tank, e.g., a modular tank of the lower reservoir system by way of a flow control system as shown in FIG. 6 to enable mitigation of a water hammer event using simply the flow control system. Therefore, the need for a separate surge suppression or protection device can be removed by utilizing at least a modular tank of the upper reservoir system and a modular tank of the lower reservoir system which together act as a surge suppression device. A modular tank can be used for serving dual purposes, i.e., as a reservoir tank and as a surge suppression tank, with the constraint that a minimum of approximately 1 to 2 feet of water shall be maintained in the tank. A modular tank of either the upper reservoir system or lower reservoir system may be constructed in the form or a bladder or otherwise. The flow control system includes a controller 72, a first fluid conductor 68 fluidly connecting the penstock 16 at a first location, e.g., location 84 of the penstock 16 to the upper reservoir system, e.g., a modular tank of the upper reservoir system, a second fluid conductor 70 fluidly connecting the penstock at a second location of the penstock 16 to the lower reservoir system, e.g., a modular tank of the lower reservoir system, a first valve 58 interposed in the first fluid conductor 68, a second valve 60 interposed in the second fluid conductor 70 and the controller 72 is configured to detect a first pressure from a first pressure sensor 74 disposed at a first pressure sensor location of the penstock 16. The first valve 58, the second valve 60 and the first pressure sensor 74 are functionally connected to the controller 72. The controller may be a dedicated controller useful for controlling the surge suppression function of the pumped storage hydroelectric system or a generic controller already configured to control or manage other functions of the pumped storage hydroelectric system, e.g., in power generation, etc. In the embodiment shown, the first location, second location of the penstock and the first pressure sensor location of the penstock are all disposed uphill of the location of a control valve 64 disposed to control a fluid flow through the penstock 16. As shown herein, the first location and the second location are one and the same location 84 as the first and second conductors branch off from the penstock 16 in the same fluid conductor for simplicity. Each fluid conductor 68, 70 may alternatively be configured to connect directly to the penstock 16. The controller 72 is configured to control the first valve 58 and the second valve 60 in response to a pressure event, e.g., a water hammer event, based upon one of the first pressure and a time derivative of the first pressure, e.g., rate of change of pressure, in a response, examples of which are disclosed elsewhere herein. The term "uphill" is used herein to mean a location that is upstream when a flow is pointed in the direction from an upper reservoir tank to a lower reservoir tank through the penstock.

In one example, the lower reservoir tank used for a surge suppression tank would be controlled to maintain at least a minimum water level in the tank, e.g., on the order of about 1-2 feet. The first valve 58 can be treated as a pressure compensating valve (PCV) as it compensates for a pressure condition when it is deemed lower than normal. In operation, the PCV is controlled to be in the open position when the pressure sensed at pressure sensor 74 is at or below a threshold pressure, allowing water to flow from the upper reservoir tank through the first fluid conductor 68 in the penstock 16, thereby raising the pressure of the fluid in the penstock 16. During minimum pressure excursions, the second valve 70, e.g., a pressure relief valve (PRV) would remain closed. When the penstock pressure rises above a threshold pressure, the PRV is configured to open, allowing a relatively small flow from the penstock to the lower reservoir tank, thereby lowering the excessive penstock pressure. When the penstock pressure is positive, i.e., above the hydrostatic pressure at pressure sensor 74, the PCV will be controlled to remain closed. Due to the high frequency pressure fluctuations of a water hammer event, the PRV and PCV valves will be controlled remotely by fast switching electronics of the controller 72, e.g., an optical switch or MOSFET transistor. Measured penstock pressure values and changes in penstock pressure are processed with a data analytics algorithm, in an attempt to anticipate pressure oscillations and then take preemptive actions by controlling the PRV and PCV valves to the open or closed positions to prevent full-scale pressure oscillations.

Rapid data sampling of penstock pressures and flowrate are conducted using at least one pressure sensor, e.g., pressure sensor 74 for pressure measurements and a flow meter 80 for a flowrate through the penstock 16. As a pressure event occurs rapidly, pressure measurements are preferably obtained in the penstock and a short distance uphill from the turbine and control valve 64 or in the proximity of the control valve 64 along the penstock 16, as it is the closure of the control valve 64 which tends to generate a water hammer event. In one embodiment, pressure measurements are obtained via pressure sensor 74. In another embodiment, one or more additional pressure sensors 76, 78 may be used to monitor pressure readings of the penstock uphill from pressure sensor 74 along the penstock 16 to result in a more accurate depiction of a standing pressure wave. If only one pressure sensor is used, then to sense the maximum variation in pressure in the shortest period of time, the pressure sensor, designated as pressure sensor 74, should preferably be located within about one meter and up to about two meters along the penstock uphill from the control valve 64. If multiple pressure sensors are used, then one pressure sensor, i.e., pressure sensor 78, should be located within approximately one meter downhill from the isolation valve 40 at the upper reservoir tank. A third pressure sensor, e.g., pressure sensor 76, should be located at approximately midway of the penstock length. If multiple pressure sensors are in use, pressure readings should be acquired simultaneously for the group of sensors.

Figure 7:
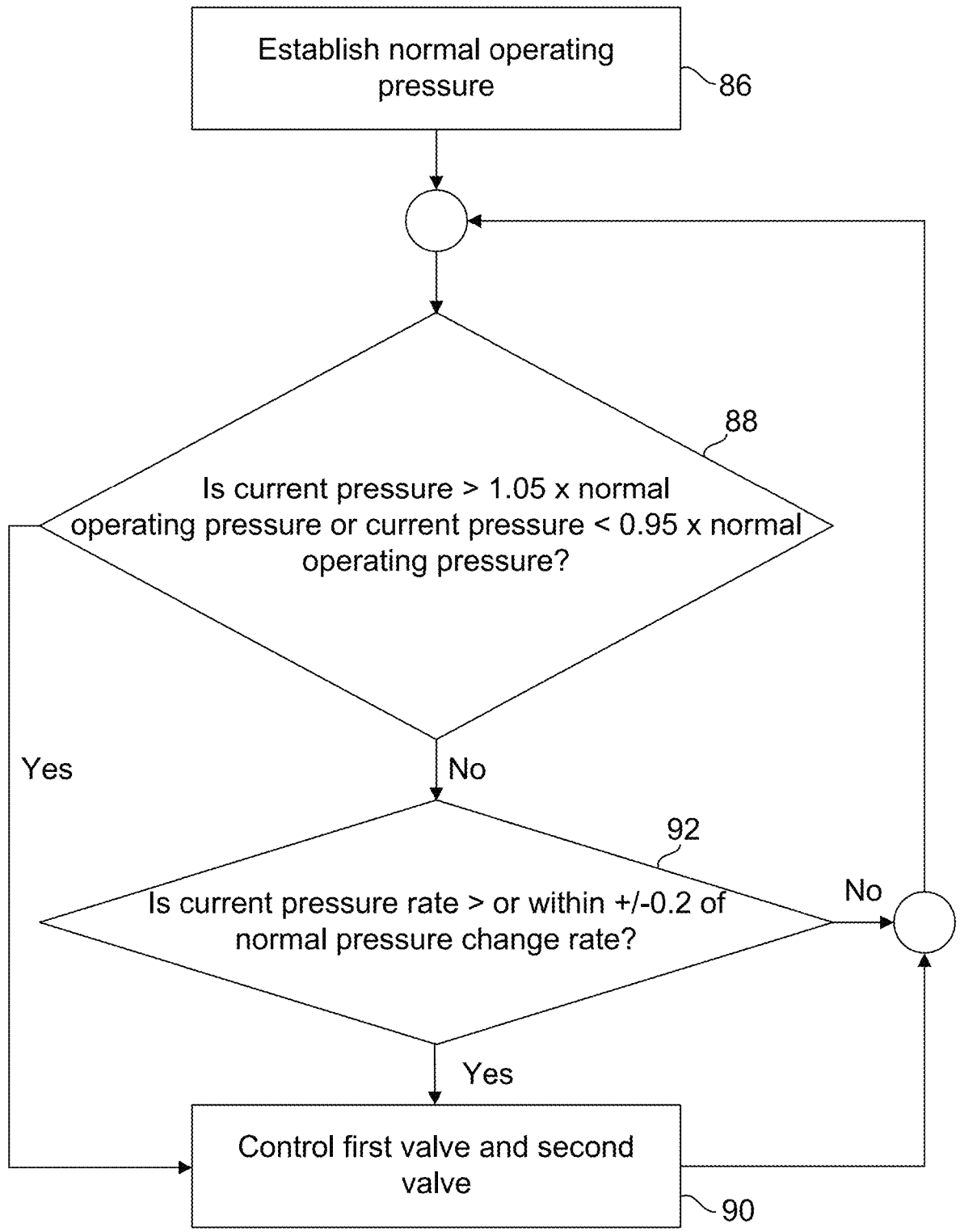
FIG. 7 is a flowchart summarizing a process of a controller of a flow control system useful for responding to an abnormal pressure event.

In order to conserve energy, pressure readings are only obtained when a water hammer event can potentially occur, i.e., when the system is in either pumping mode where fluid is moved from a lower reservoir tank to an upper reservoir tank, or generating mode where fluid is moved from an upper reservoir tank to a lower reservoir tank. During a pumping or generating mode, the measured pressure and flowrate data are continuously monitored and input to a data store or historian and accessed by the controller 72 for performing data analytics. A data analytics algorithm is configured to compute several parameters on an ongoing basis, e.g., the maximum and minimum pressure readings over about 0.1 second time intervals and rates of change of pressure with respect to time over about 0.1 second time intervals. If multiple in-line pressure sensors are used, the spatial and temporal pressure differences during a water hammer event can be represented by the multiple pressure measurements. In one embodiment, the in-line pressure readings are analyzed for spatial and temporal changes and the determination of a standing pressure wave or the onset of one. Therefore, if multiple pressure sensors are used, a high probability of a water hammer event can be ascertained from pressure sensor readings of each pressure sensor before mitigation actions are effected. An algorithm useful for processing the aforementioned data for determining the probability of or the onset of a water hammer event is run on the controller 72 or run remotely on a remote computer with pertinent results communicated to the controller 72. The algorithm may use historical databases for both the pumping state and the generating state for determining typical pressures during both normal or steady state operation and during water hammer events. In the absence of actual operating data, these databases can be populated with simulation data specific to the particular pumped storage hydroelectric system. As operating data becomes available, it will be added to the databases. The maximum and minimum measured pressures will be compared to historical or simulated pressure readings at the measurement locations during normal or steady state operation for the appropriate flowrate as indicated by flow meter 80. In one embodiment, a 5% deviation between measured pressure readings and the pressure corresponding to normal or steady state operation indicates a high probability for a water hammer event. FIG. 7 is a flowchart summarizing a process of a controller of a flow control system that is useful for responding to an abnormal pressure event, e.g., a water hammer event. As every pumped storage hydroelectric system may be configured differently, it is imperative to establish a normal operating pressure in step 86 during pumping or generating mode as disclosed elsewhere herein. In this step, simulated pressure readings may be used if measured pressure readings are not available, e.g., during the initial start-up of a pumped storage hydroelectric system that has just been installed and commissioned. Upon establishing the normal operating pressure of the pumped storage hydroelectric system, an abnormal pressure event can then be detected by comparing measured pressure readings with the normal operating pressure as shown in step 88. If an abnormal pressure event has been detected, control outputs are transmitted to control the first valve 58 and second valve 60 to their desired states to mitigate this abnormal pressure event as in step 90. In one embodiment, the algorithm additionally or alternatively computes and analyzes rates of change of the measured pressure with respect to time. A failed control valve 64 which inadvertently closes abruptly typically occurs in 1 to 2 seconds. In one embodiment, in order to determine the pressure response characteristics that represent a water hammer event, pressure responses as indicated by pressure sensor 74 for a valve closure time of about 3 to 4 seconds, are used. The computed rates of measured pressure change are compared to historical or simulated values under water hammer conditions for a valve closure time of about 3 to 4 seconds. It has been determined that if the measured rate of pressure change is greater than or +20% of the value corresponding to the historical or simulated value as determined in step 92, the controller 72 on which such deviation is detected, would indicate a high probability for water hammer and initiate one or more steps for mitigation. The controller 72 is configured to control the actions of the first valve 58 and the second valve 60 once it has been determined that there is a high likelihood that water hammer will occur. In one embodiment, the action includes initiating a cycle of opening and closing of the PCV and PRV valves consecutively. As the pressure rises to a threshold value above the hydrostatic penstock pressure as indicated by pressure sensor 74, the PRV will be opened. As the pressure declines to a threshold value below the hydrostatic penstock pressure as indicated by pressure sensor 74, the PCV will be opened. In some occasions, a few cycles of opening and closing of the PRV and PCV valves may be required to suppress the water hammer. Therefore, in one embodiment, a mitigation action includes initiating a cycle of opening and closing of the PCV and PRV valves consecutively.

Figure 8:
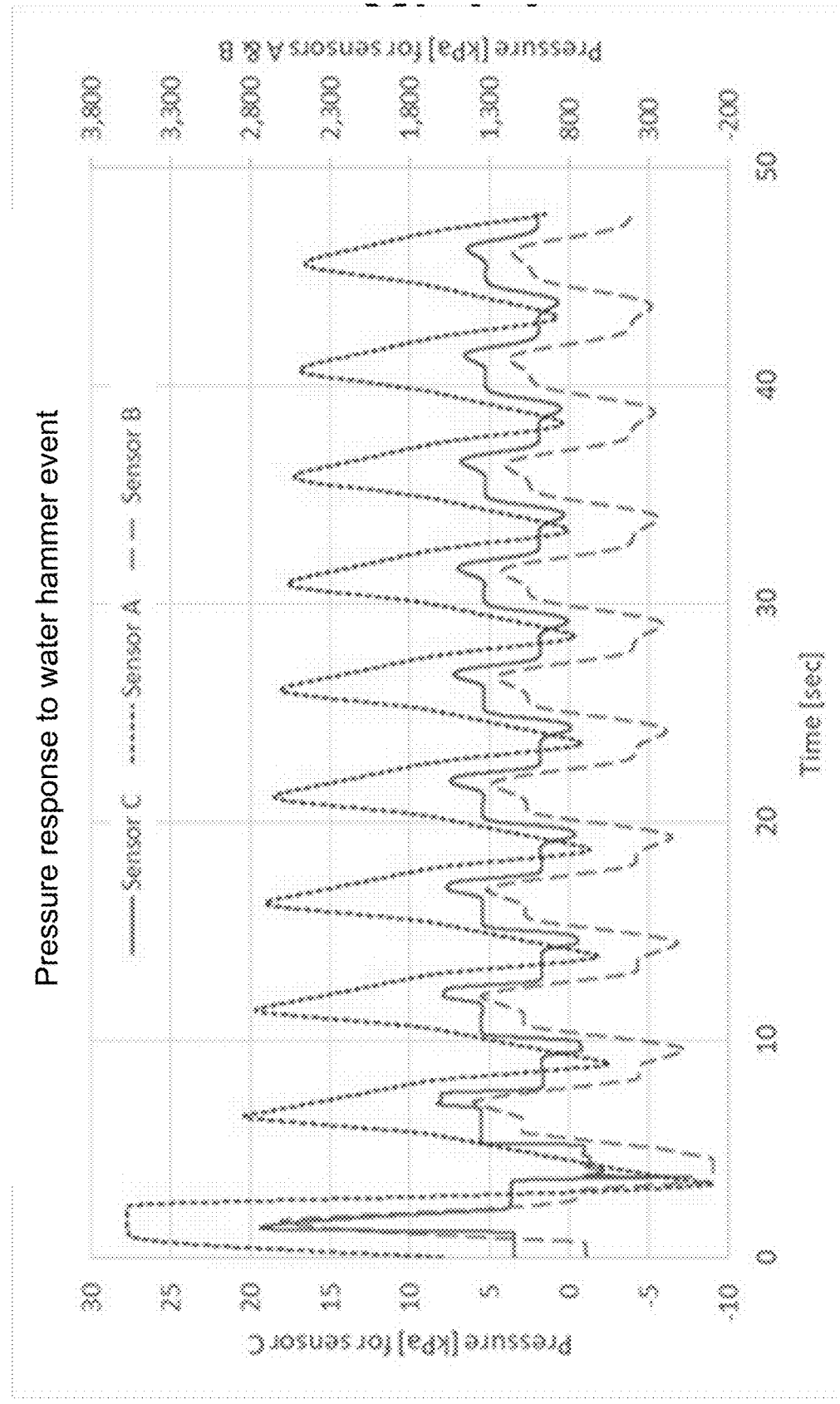
FIG. 8 is a chart depicting a pressure response to a water hammer event caused by a control valve closure time of 1 second, without any mitigation steps having been taken to mitigate the water hammer event.
Figure 9:
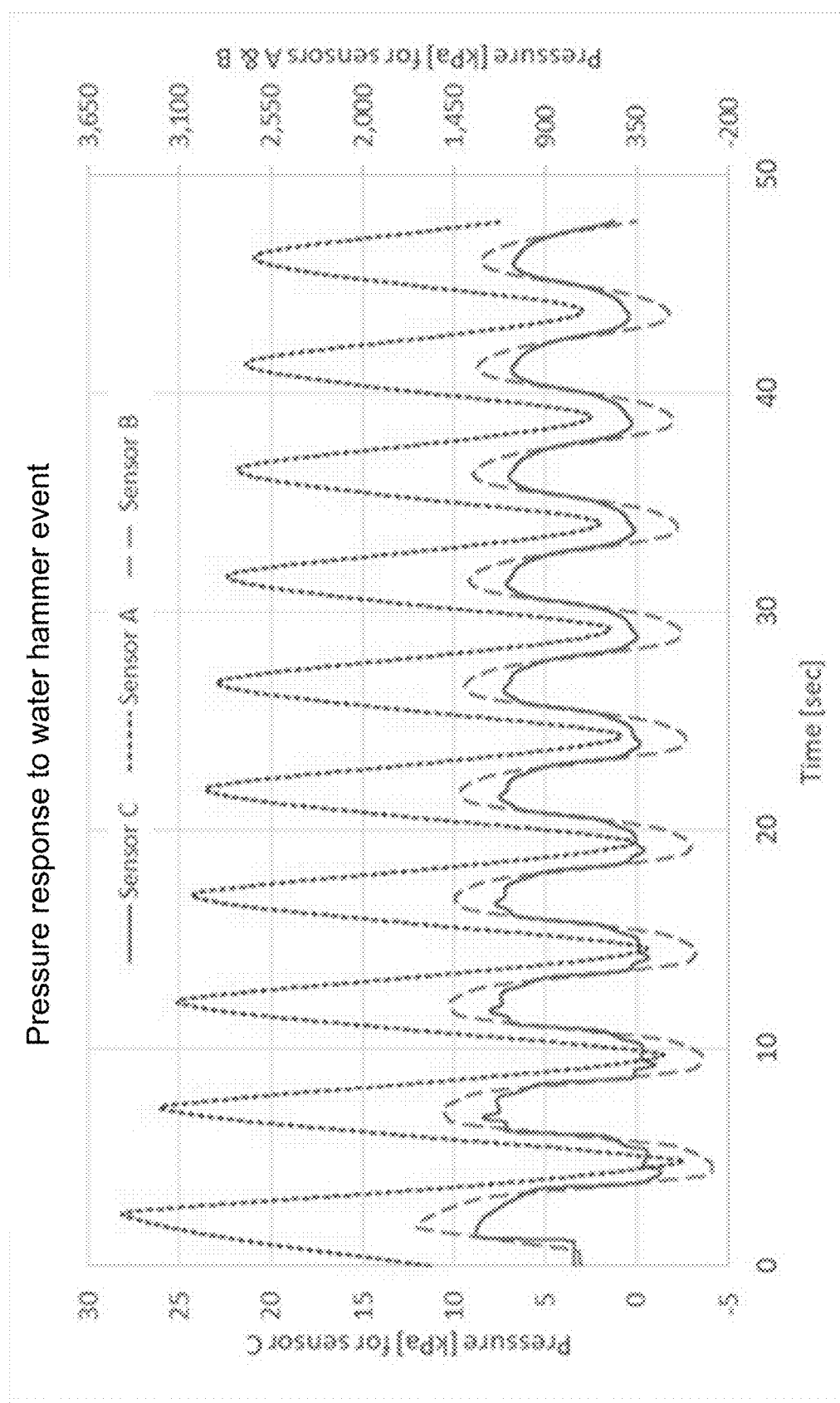
FIG. 9 is a chart depicting a pressure response to a water hammer event caused by a control valve closure time of 3 seconds, without any mitigation steps having been taken to mitigate the water hammer event.

FIG. 8 is a chart depicting a pressure response to a water hammer event caused by a control valve closure time of 3 seconds, without any mitigation steps having been taken to mitigate the water hammer event. FIG. 9 is a chart depicting a comparison of pressure response to a water hammer event with and without mitigation steps having been taken to mitigate the water hammer event. In one example, a pumped storage hydroelectric system with an elevation head of 175 m and penstock length of 450 m is used. It is configured to operate with a full load capacity of 5 MW. A steady state operating or gage pressure, e.g., as indicated by pressure sensor 74 disposed just uphill of the control valve 64, is about 1600 kPa. If the control valve 64 closes abruptly in 1 second during the pumping or generating mode, the approximate pressure response due to a water hammer scenario is shown in FIG. 8 at the three pressure sensors 74, 76, 78 also designated as sensor A, B and C, respectively. If the control valve 64 closes more slowly, e.g., in 3 seconds, the approximate pressure response due to a water hammer scenario is shown in FIG. 9 at the three pressure sensors 74, 76, 78. It shall be noted that the pressure responses in FIG. 8 and FIG. 9 are unmitigated, i.e., no surge suppression or protection device is in use. Referring to FIG. 8, the pressure value detected by sensor A increases by 221 kPa in the initial 0.1 sec time interval. The corresponding increases for sensors B and C are essentially zero for the same 0.1 sec interval. It shall be noted that some time is required for waves to propagate to sensors B and C. However, for sensor A, the pressure increase represents a 13.8% change from the steady state pressure, which is greater than 5% and therefore the controller 72 on which such deviation is detected, would indicate a high probability for water hammer and initiate one or more steps for mitigation.

As shown in FIG. 9, if the valve closure time is 3 sec, then the pressure for sensor A increases by 75 kPa in the initial 0.1 sec time interval. The corresponding increases for sensors B and C are essentially zero for the same 0.1 sec interval. For sensor A, the pressure increase represents a 4.7% change of the steady state pressure, which is less than 5% and therefore the algorithm would not trigger a high probability for water hammer. However, for the next 0.1 sec interval, the pressure continues to rise at sensor A and the pressure at the end of 0.2 sec is 178 kPa, which represents a 11.1% change from the steady state pressure, which is greater than 5% and therefore the controller 72 on which such deviation is detected, would indicate a high probability for water hammer and initiate one or more steps for mitigation. For sensors B and C, even after 0.2 sec, the pressure changes are still less than 5% of the steady state values. Referring back to FIG. 8, if valve closure occurs in 1 sec, the rate of change in pressure at sensor A would be 2210 kPa/sec for the first 0.1 sec interval. In one embodiment, this rate of change is compared to a rate of change in the event the control valve 64 closes in 3 sec for this example for the controller to determine a water hammer event exists. For the 3-sec valve closure as shown in FIG. 9, the rate of change in pressure at sensor A is 750 kPa/sec for the first 0.1 sec interval. Therefore 2210 kPa/sec is greater than the pressure indicated at sensor A of 750 kPa/sec and the algorithm would trigger a high probability for water hammer and initiate one or more steps for mitigation.

Figure 10:
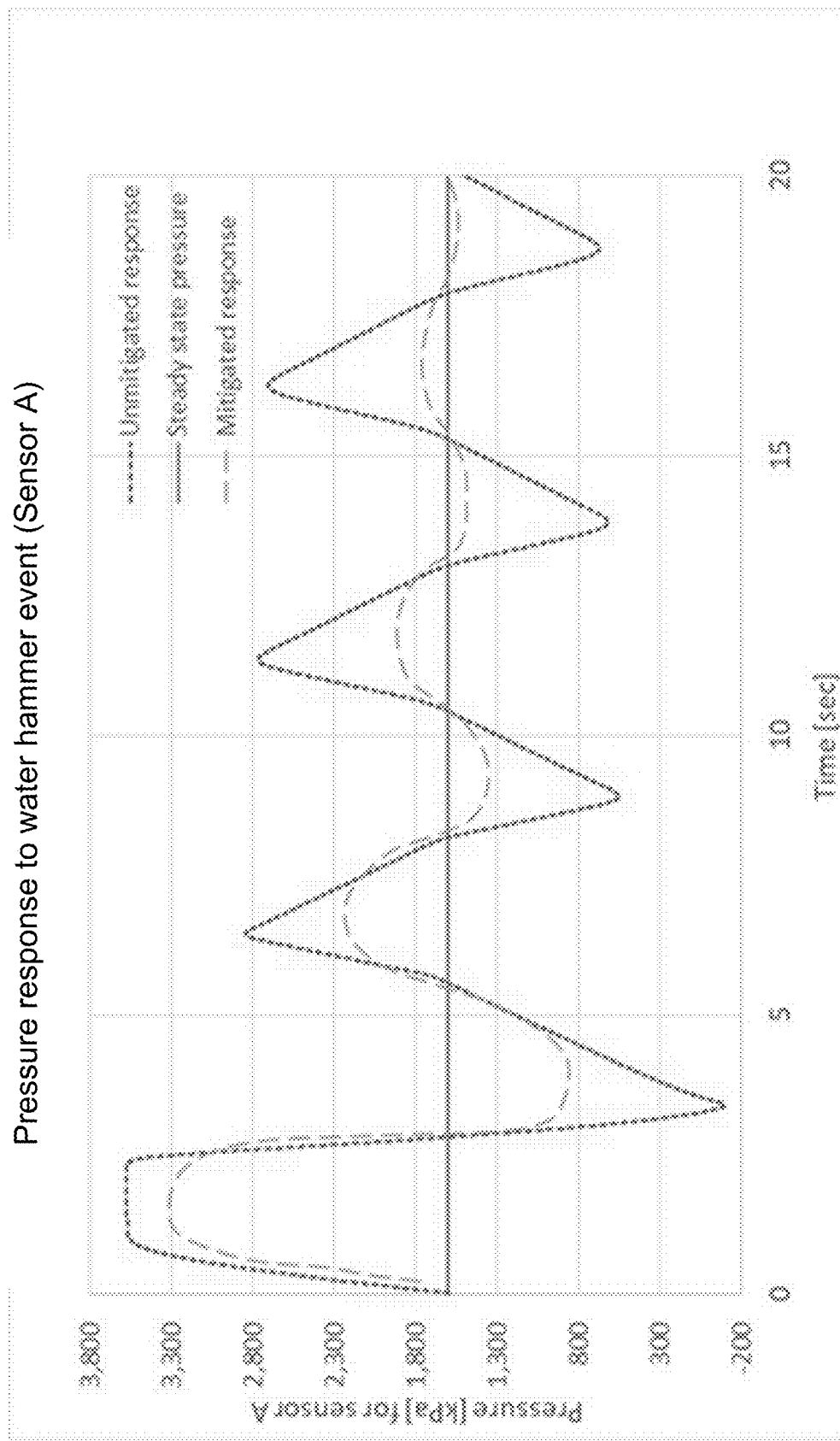
FIG. 10 is a chart depicting a comparison of pressure response to a water hammer event with and without mitigation steps having been taken to mitigate the water hammer event.
Figure 11:
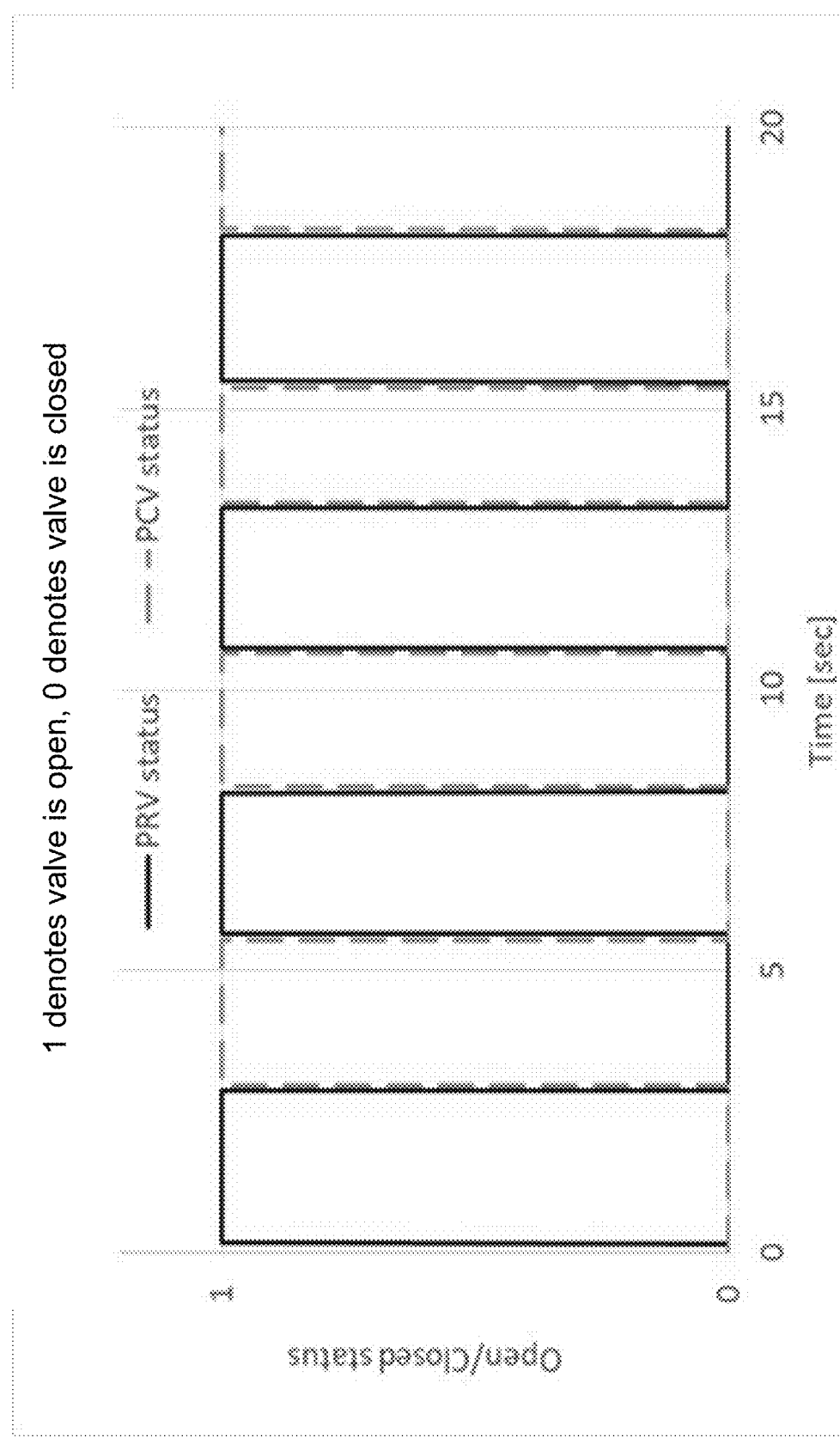
FIG. 11 is diagram depicting controlled reactions of two valves in response to a water hammer event generated as a result of a 1-second control valve closure time.

FIG. 10 is diagram depicting controlled reactions of two valves in response to a water hammer event generated as a result of a 1-second control valve closure time. It shows a mitigated and unmitigated pressure response of sensor A for comparison. After the controller 72 has identified a water hammer event, a check is made to ensure that the penstock pressure as indicated by pressure sensor A is rising, and it is above the hydrostatic pressure value. If this is the case, the PRV valve is opened, and it stays open until the penstock pressure falls to within a ±10% deviation of the hydrostatic pressure, i.e., P<1.1P_hydro where P_hydro is the hydrostatic penstock pressure, at which time the PRV valve is controlled to the closed state. The penstock pressure should continue to fall and when it falls below a 10% deviation from the hydrostatic pressure (i.e., P<0.9P_hydro), the PCV valve is controlled to the open state. The PCV valve remains open until the penstock pressure rises to within a 10% deviation from the hydrostatic pressure (i.e., P>0.9P_hydro), at which time the PCV valve is controlled to be disposed in the closed state. The penstock pressure should continue to rise, and when the pressure level rises above a 10% deviation of the hydrostatic pressure, i.e., P>1.1P_hydro, the PRV valve is controlled to be disposed in the open state. The process continues until the measured penstock pressure deviations about the hydrostatic pressure are less than ±5%, at which time both the PRV and PCV are controlled to be disposed in their closed state. This procedure results in a slight delay when both the PRV and PCV valves are closed as valves do take a finite measurable amount of time to be disposed in their closed state from their open state. FIG. 11 shows a controlled response for mitigating a water hammer event for 1 sec valve closure time. It shall be noted that the two valves are alternatingly disposed in opposite states while mitigating a water hammer event.

While various features, embodiments, and implementations have been described herein, it will be appreciated that such description is intended for the purpose of illustration, and not of limitation. For example, various individual features and/or aspects of the described embodiments may be described the other individual features and/or aspects of other described embodiments. Accordingly, the present invention should not be limited to any disclosed embodiment, but should be given the full breadth of the claimed appended hereto.

What is claimed herein is:

1. A pumped storage hydroelectric system comprising:
    (a) a reservoir system comprising an upper reservoir system and a lower reservoir system, at least one of the upper reservoir system and the lower reservoir system including a modular reservoir arrangement, wherein the modular reservoir arrangement comprises an array of modular tanks, the array of modular tanks comprising a plurality of modular tanks;
    (b) a penstock coupled with the upper reservoir system;
    (c) a pump/turbine coupled with the penstock and with the lower reservoir system, the pump/turbine configured to receive water flowing from the upper reservoir system to the lower reservoir system for generating electrical power, and pump water from the lower reservoir system to the upper reservoir system for storing energy; and
    (d) a flow control system comprising a controller, a first fluid conductor fluidly connecting the penstock at a first location of the penstock to the upper reservoir system, a second fluid conductor fluidly connecting the penstock at a second location of the penstock to the lower reservoir system, a first valve interposed in the first fluid conductor, a second valve interposed in the second fluid conductor, the controller is configured to detect a first pressure indicated by a first pressure sensor at a first pressure sensor location of the penstock, the first valve, the second valve and the first pressure sensor are functionally connected to the controller, the first location of the penstock and the first pressure sensor location of the penstock are both uphill of the location of a control valve disposed to control a fluid flow through the penstock, the controller is further configured to control the first valve and the second valve in response to a pressure event based on at least one of the first pressure and a time derivative of the first pressure, in a response.

2. The pumped storage hydroelectric system according to claim 1, wherein the response is a response in which the first valve is controlled to be disposed in one of an open position and a closed position.

3. The pumped storage hydroelectric system according to claim 1, wherein the response is a response in which the second valve is controlled to be disposed in one of an open position and a closed position.

4. The pumped storage hydroelectric system according to claim 1, wherein the response is a response in which the first valve is controlled to be disposed in one of an open position and a closed position while the second valve is controlled to be disposed in a position opposite that of the position of the first valve.

5. The pumped storage hydroelectric system according to claim 1, wherein the response is a response in which the first valve is controlled to be disposed in an open position to allow a flow through the first fluid conductor into the penstock.

6. The pumped storage hydroelectric system according to claim 1, wherein the response is a response in which the second valve is controlled to be disposed in an open position to allow a flow through the second fluid conductor out of the penstock.

7. The pumped storage hydroelectric system according to claim 1, wherein the controller is further configured to detect a second pressure at a second pressure sensor location and the controller is further configured to control the first valve and the second valve in response to the pressure event based additionally on the second pressure and a time derivative of the second pressure in the response.

8. The pumped storage hydroelectric system according to claim 1, wherein the first location of the penstock is the same as the second location of the penstock.

9. The pumped storage hydroelectric system according to claim 1, wherein the first location of the penstock is a location of up to about two meters uphill of the control valve along the penstock.

10. The pumped storage hydroelectric system according to claim 1, wherein the modular reservoir arrangement comprises one or more modular reservoir tanks fluidly coupled with one or more of the penstock and the pump/turbine.

11. The pumped storage hydroelectric system according to claim 10, wherein the one or more modular reservoir tanks include standardized reservoir tanks.

12. The pumped storage hydroelectric system according to claim 10, wherein the one or more modular reservoir tanks include at least partially flexible tank bladders.

13. The pumped storage hydroelectric system according to claim 1, wherein the pump/turbine is configured to receive at least a portion of power for pumping water from the lower reservoir system to the upper reservoir system from a renewable energy source.

14. The pumped storage hydroelectric system according to claim 13, wherein the renewable energy source includes a wind energy source including one or more wind turbines.

15. The pumped storage hydroelectric system according to claim 14, wherein the renewable energy source includes a solar energy source comprising one or more of:
    a plurality of photovoltaic panels and one or more solar ponds equipped for producing electricity.

16. The pumped storage hydroelectric system according to claim 15, wherein at least a portion of the photovoltaic panels are arranged to at least partially shade at least a portion of the reservoir system.

* * * * *